United States Patent
Allread

[15] 3,645,294
[45] Feb. 29, 1972

[54] SELF-SEALING COUPLING
[72] Inventor: Alan R. Allread, Jackson, Mich.
[73] Assignee: Aeroquip Corporation, Jackson, Mich.
[22] Filed: Oct. 19, 1970
[21] Appl. No.: 82,004

[52] U.S. Cl............137/614.03, 137/614, 137/614.04
[51] Int. Cl..................F16l 37/22, F16l 37/28
[58] Field of Search..........137/614, 614.01, 614.02, 614.03, 137/614.04, 614.05, 614.06

[56] References Cited

UNITED STATES PATENTS 2,958,544  11/1960  Wurzburger..................137/614.03
3,382,892  5/1968  Cerbin..........................137/614.02
3,508,580  4/1970  Snyder..........................137/614.04

Primary Examiner—Samuel B. Rothberg
Assistant Examiner—William H. Wright
Attorney—Jerry K. Harness

[57] ABSTRACT

A self-sealing coupling for a manifold, so constructed as to permit slight misalignment of the manifold and accessory ports. The coupling comprises male and female cartridges which are mounted on the manifold and accessory members. Each cartridge comprises a housing mountable in the port, a ball segment body rockably carried by the housing, and a self-sealing coupling valve mounted in the body.

8 Claims, 3 Drawing Figures

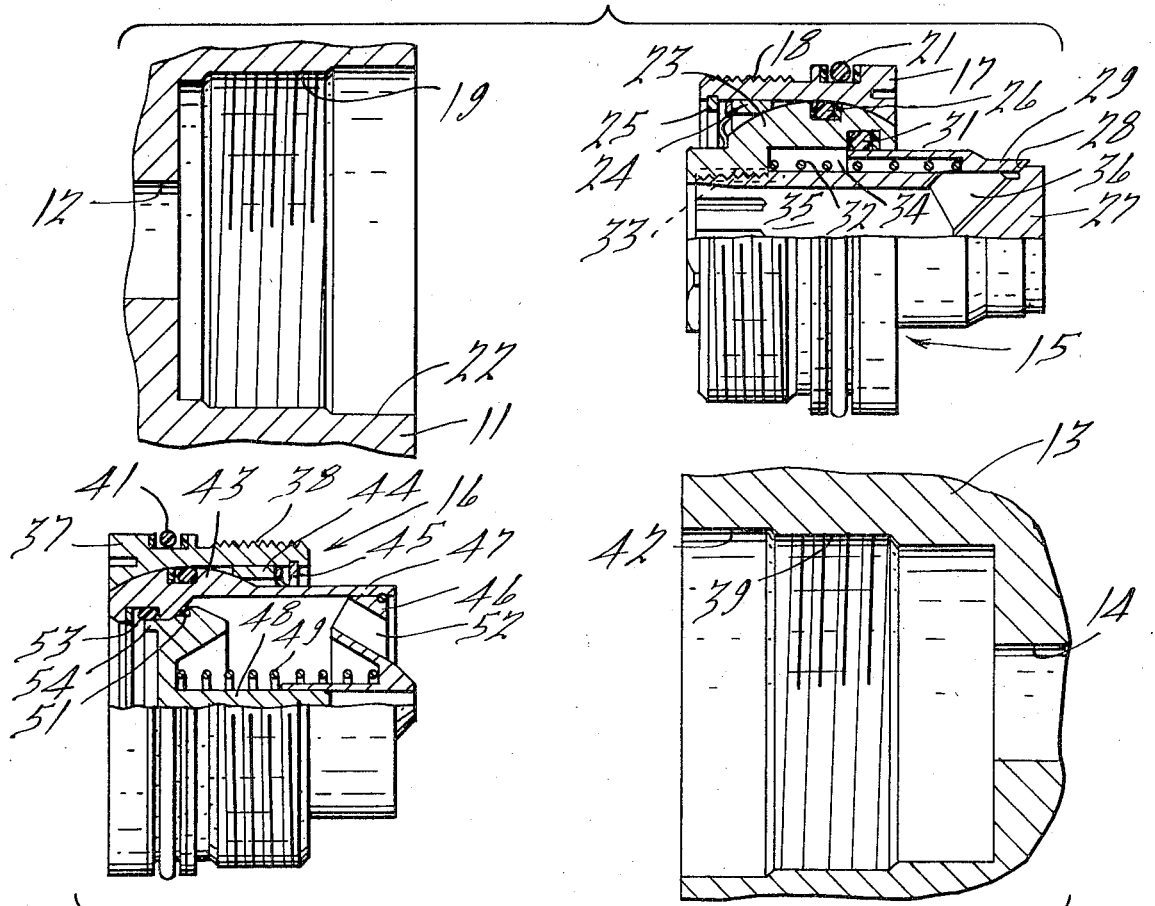
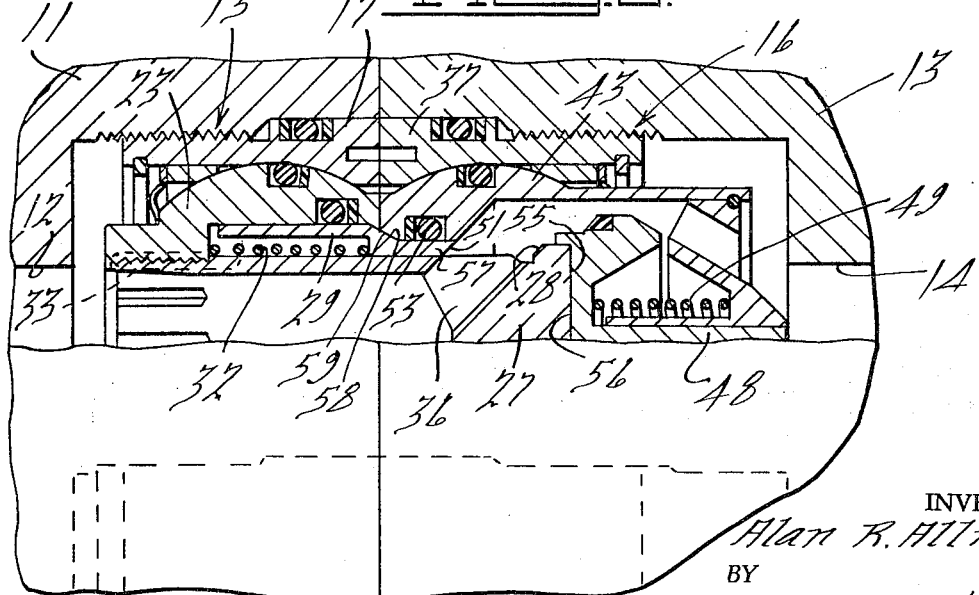

SELF-SEALING COUPLING

BACKGROUND OF THE INVENTION

1. Field of the Invention

The invention relates to fluid connections in which a manifold carrying one or more fluid ports is secured to an accessory carrying like ports.

2. Description of the Prior Art

Self-sealing couplings have been mounted in the manifold and accessory ports which open automatically when the two members are brought together. However, these couplings are so constructed that the ports on the manifold and accessory members must be substantially perfectly aligned in order for the couplings to open properly. Thus, extremely close tolerances are required for the manufacture of the manifold and accessory ports, increasing the cost of fabrication. In a typical instance, such tolerances are in the range of 0.001 to 0.002 inch.

BRIEF SUMMARY OF THE INVENTION

According to the present invention, the self-sealing coupling is in the form of two cartridges which are mountable in the manifold and accessory port members. Each cartridge has a housing which carries a rockable ball segment body. A self-sealing valve is mounted in each body, the construction being such that the valves will open when the port members are brought together. The rockable ball segment bodies will permit proper engagement of the coupling halves even though there is some misalignment between the ports themselves. In a typical construction, a permissible misalignment is 0.035 inch.

BRIEF DESCRIPTION OF THE DRAWINGS

FIG. 1 is a partially cross-sectioned view of a portion of an accessory port member and the male cartridge of the coupling shown in disassembled position;

FIG. 2 is a similar view showing the manifold port member and the female cartridge in disassembled position; and FIG. 3 is a partially cross-sectioned view showing portions of both port members after they have been brought together and the coupling cartridges united.

DESCRIPTION OF THE PREFERRED EMBODIMENT

The purpose of the invention is to provide a means for connecting an accessory port member 11 having one or more fluid ports 12, and a manifold port member 13 having fluid ports 14, as shown in FIGS. 1 and 2 respectively. Ordinarily, ports 12 and 14 must be in near perfect alignment in order for conventional self-sealing couplings to be properly engaged. The coupling of the present invention comprises a male cartridge generally indicated at 15 and a female cartridge generally indicated at 16. Cartridge 15 comprises a housing 17 having a threaded portion 18 which is receivable by an internally threaded counterbore 19 of port 12. The outer portion of housing 17 carries an annular seal 21 engageable with a smooth counterbore surface 22 of member 11.

A ball segment body 23 is mounted within housing 17, being held in position by a bearing 24 and a retainer ring and washer 25. A seal 26 is carried by the body and engages the inside of housing 17, the ball being rockable to a limited extent with respect to the housing.

A valve 27 is threadably mounted in a tubular portion of body 23 and extends therethrough, outwardly of housing 17. Valve 27 has an inclined sealing surface 28 which is engaged by one end of a sleeve 29 slidably mounted thereon. This sleeve extends within body 23 and is engaged by an annular seal 31 carried by the body. It is urged against seat 28 by a helical coil compression spring 32 which is disposed between the body and sleeve. A plurality of axially extending passages 33 permit pressurized fluid to enter the chamber 34 between sleeve 29 and valve 27, thus permitting the fluid pressure to create a sealing action.

Valve 27 has a hollow interior 35 which leads to angular passages 36 adjacent seat 28. Therefore, when sleeve 29 is retracted as in FIG. 3, fluid will be permitted to flow through the cartridge.

Cartridge 16 likewise comprises a housing 37 having a threaded portion 38 mountable in a counterbore 39 of port 14. A seal 41 on housing 37 engages a smooth portion 42 of the counterbore. A body 43 in the form of a ball segment is mounted within housing 37 and held in place by a bearing 44 and retainer ring and washer 45. Body 37 thus is permitted limited rocking movement with respect to the housing.

A guide 46 is mounted in the tubular end 47 of body 37, and slidably supports a poppet valve 48. This valve is urged by a helical coil compression spring 49 against an annular seat 51 carried within body 43. Passages 52 in guide 46 permit fluid pressure to act against valve 48, holding it in its closed position. An annular seal 53 is carried by body 43 and is held in place by a lip 54 on valve 48 when the latter is closed. The purpose of seal 53 will appear hereinafter.

In use, cartridges 15 and 16 will be mounted in port members 11 and 13 as shown in FIG. 3, the outer surfaces of housings 17 and 37 being flush with the faces of their respective port members. Both valves will be held in their closed positions by fluid pressure and springs 32 and 49. To make the connection, the port members will be brought together. This will cause the end 55 of valve 27 to engage the end 56 of valve 48, lifting valve 48 from its seat. At the same time, the reduced portion 57 of sleeve 29 will engage seal 53, and an inclined surface 58 on the sleeve will engage a complementary surface 59 at the outer end of body 43. This will cause sleeve 29 to retract, opening passages 36 so that the couplings will be connected as shown in FIG. 3. Outside means (not shown) are provided for securing port members 11 and 13 in their coupled position.

It will be noted that the construction of the cartridges is such that misalignment between ports 12 and 14 will not prevent a proper connection from being formed. More particularly, valves 27 and 48 may be tilted into alignment with each other by virtue of the fact that they are carried by bodies 23 and 43 which are rockably mounted in their respective port members.

What is claimed is:

1. In a self-sealing fluid coupling for connecting two members having ports which may not be exactly aligned, first and second cartridges, each cartridge having a housing mounted in one of said members in alignment with the port thereof, bodies mounted in said housings and having ball segment portions which permit limited rocking movement of the bodies with respect to the housings, means retaining the bodies in the housings, valves mounted in said bodies and connected to said ports whereby the valves are normally held in closed position by fluid pressure, and interengaging surfaces on said valves and bodies responsive to the mating of said cartridges to open the valves, thereby permitting fluid flow between said ports, said ball segments permitting the interengaging surfaces to be properly aligned despite misalignment of said ports.

2. The combination according to claim 1, said housings having threaded portions mountable in counterbores of said ports, and annular seals engageable with said counterbores.

3. The combination according to claim 1, said means for retaining the bodies in position comprising bearings mounted in said housings and retaining rings holding said bearings.

4. The combination according to claim 3, further provided with seals carried by said bodies and engageable with the interior surfaces of said housings.

5. The combination according to claim 1, one of said valves being fixed to its body and extending outwardly therefrom, a sleeve slidably mounted on said valve and engaging a seat thereon to close the valve, and fluid conduit means leading to said sleeve whereby fluid pressure will urge the sleeve to its closed position.

6. The combination according to claim 5, further provided with a spring urging said sleeve to its closed position, and a seal between said sleeve and body.

7. The combination according to claim 1, the valve in a first of said cartridges being slidably mounted in its body and engaging a seat formed in the body, fluid pressure in the body urging said valve to its closed position, and a seal carried by said body and engageable with a portion of the second cartridge when the cartridges are united.

8. The combination according to claim 7, the valve in said second cartridge being fixed to its body and engageable with said slidably mounted valve of the first cartridge when the cartridges are united to open the latter valve, a sleeve slidably mounted on said fixed valve and normally urged to a position closing the valve, said sleeve engaging the seal carried by said first cartridge body when the cartridges are inserted, and interengaging surfaces on said sleeve and said first cartridge body causing said sleeve to move to an open position when the cartridges are united.

* * * * *